United States Patent
Richardson et al.

(10) Patent No.: US 9,360,083 B2
(45) Date of Patent: Jun. 7, 2016

(54) WHEEL WEIGHTS

(75) Inventors: Phillip Richardson, Thame (GB);
William Earnest Taylor Vallance, Marlow (GB)

(73) Assignee: LAMA D.D. DEKANI, Dekani (SI)

(*) Notice: Subject to any disclaimer, the term of this patent is extended or adjusted under 35 U.S.C. 154(b) by 572 days.

(21) Appl. No.: 13/641,529

(22) PCT Filed: Apr. 15, 2011

(86) PCT No.: PCT/GB2011/000593
§ 371 (c)(1),
(2), (4) Date: Dec. 7, 2012

(87) PCT Pub. No.: WO2011/128654
PCT Pub. Date: Oct. 20, 2011

(65) Prior Publication Data
US 2013/0127232 A1 May 23, 2013

(30) Foreign Application Priority Data

Apr. 16, 2010 (GB) .................................. 1006430.1
Mar. 3, 2011 (GB) .................................. 1103683.7

(51) Int. Cl.
*F16F 15/34* (2006.01)
(52) U.S. Cl.
CPC .................................. *F16F 15/345* (2013.01)
(58) Field of Classification Search
CPC .......... F16F 15/32; F16F 15/34; F16F 15/324
USPC ................................................. 301/5.21, 22
See application file for complete search history.

(56) References Cited

U.S. PATENT DOCUMENTS

| | | | | |
|---|---|---|---|---|
| 1,667,344 A * | 4/1928 | Couture | ........................ | 301/5.21 |
| 1,889,577 A * | 11/1932 | Tibbetts | ........................ | 301/5.21 |
| 2,029,561 A * | 2/1936 | Du Sang | ........................ | 301/5.21 |
| 2,370,361 A * | 2/1945 | Le Jeune | ........................ | 301/5.21 |
| 2,697,345 A * | 12/1954 | Currier | ........................ | 73/487 |
| 3,273,941 A * | 9/1966 | Skidmore | ........................ | 301/5.21 |
| 3,669,500 A * | 6/1972 | Ende | ........................ | 301/5.21 |
| 3,688,380 A * | 9/1972 | Hofmann et al. | .......... | 29/243.56 |
| 4,379,596 A * | 4/1983 | Green et al. | ................ | 301/5.21 |
| 6,553,831 B1 * | 4/2003 | Schmidt et al. | ................ | 73/470 |
| 6,948,781 B2 | 9/2005 | Sery | | |
| 2004/0256909 A1 * | 12/2004 | Sery | ........................ | 301/5.21 |
| 2007/0120414 A1 * | 5/2007 | Jenkins et al. | ............... | 301/5.21 |

FOREIGN PATENT DOCUMENTS

| | | | | |
|---|---|---|---|---|
| DE | 102006039485 A1 | 2/2008 | | |
| EP | 1927784 A1 | 6/2008 | | |
| FR | 755447 | * 11/1933 | ............ | F16F 15/324 |
| FR | 755447 A | 11/1933 | | |
| JP | 10220532 A | * 8/1998 | .............. | F16F 15/34 |
| WO | WO2007114690 A2 | 10/2007 | | |

* cited by examiner

*Primary Examiner* — Jason Bellinger
(74) *Attorney, Agent, or Firm* — Alan D. Kamrath; Kamrath IP Lawfirm, P.A.

(57) ABSTRACT

Wheel weight assemblies include a weight member (212) mounted on a clip member (211) for attachment to the rim of a vehicle wheel, with the clip and weight members being substantially encased in an injection molded housing. The weight member (212) may be composed of a plurality of individual plate elements. Spacing elements such as end caps (250) may be used to hold the plate elements together and locate them in the mold tool to ensure their correct positioning during the molding process.

21 Claims, 7 Drawing Sheets

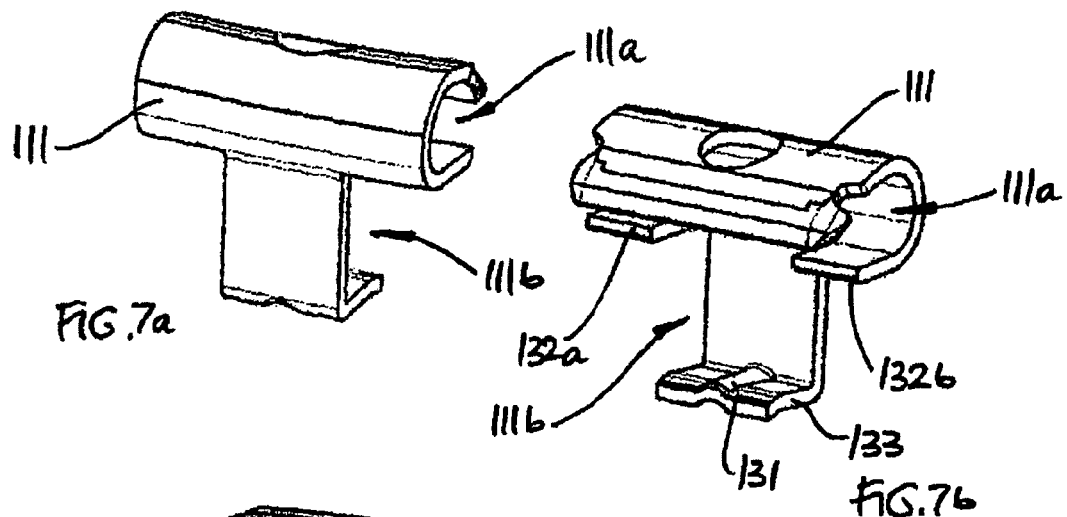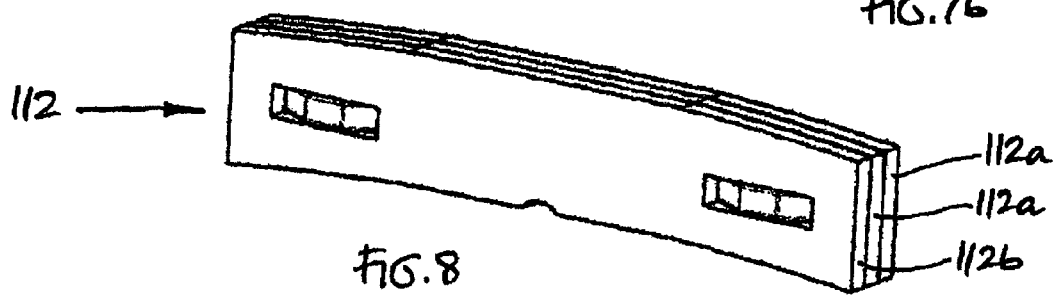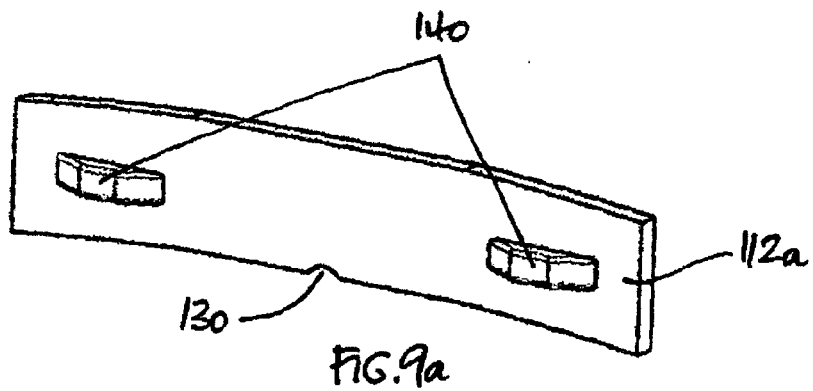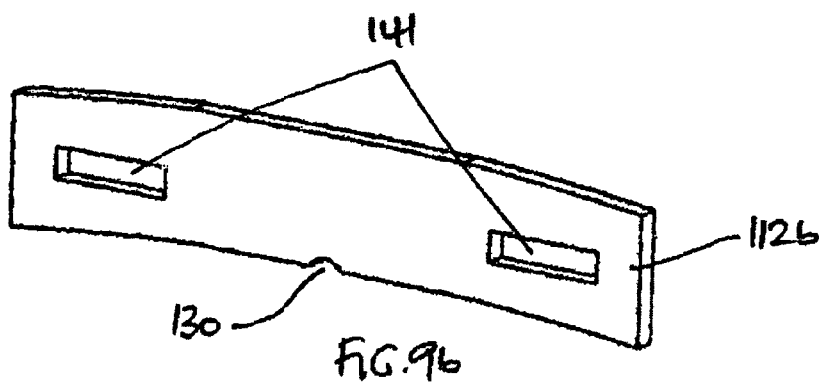

WHEEL WEIGHTS

This invention relates to wheel weights.

Wheel weights for balancing vehicle wheels have traditionally used lead as the ballast material, mainly because it is easily workable and relatively heavy. However, the practice of using lead has largely died out now, due to environmental concerns. Various alternative materials such as coated steel or cast zinc have been proposed instead. The present invention offers alternative designs.

In one aspect, the invention provides a wheel weight assembly comprising a clip member and a weight member. The clip member has first means for attaching the assembly to a wheel rim, and second means for mounting the weight member. The weight member is in the form of a composite sub-assembly comprising a plurality of individual elements.

In another aspect, the invention provides a wheel weight assembly comprising a clip member and a weight member. The clip member has first means for attaching the assembly to a wheel rim, and second means for mounting the weight member. The weight member is in the form of a length of standard rod or bar stock, and the clip and weight members together form a sub-assembly which is substantially encased in a housing.

Figure 1:
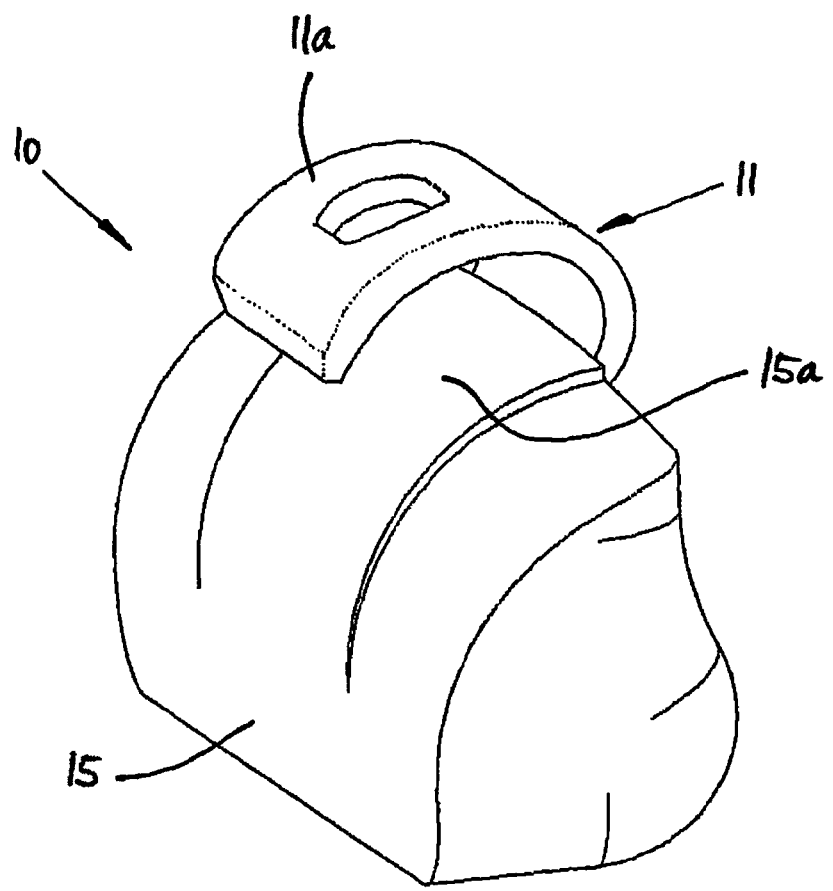
Figure 2:
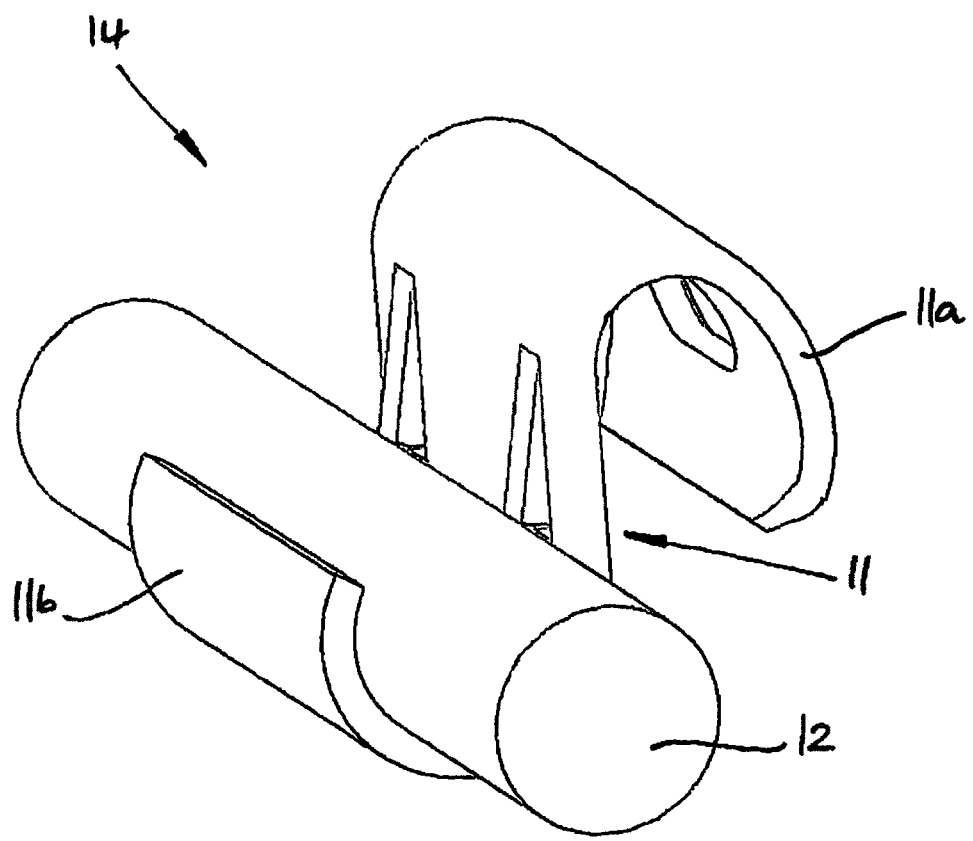
Figure 3:
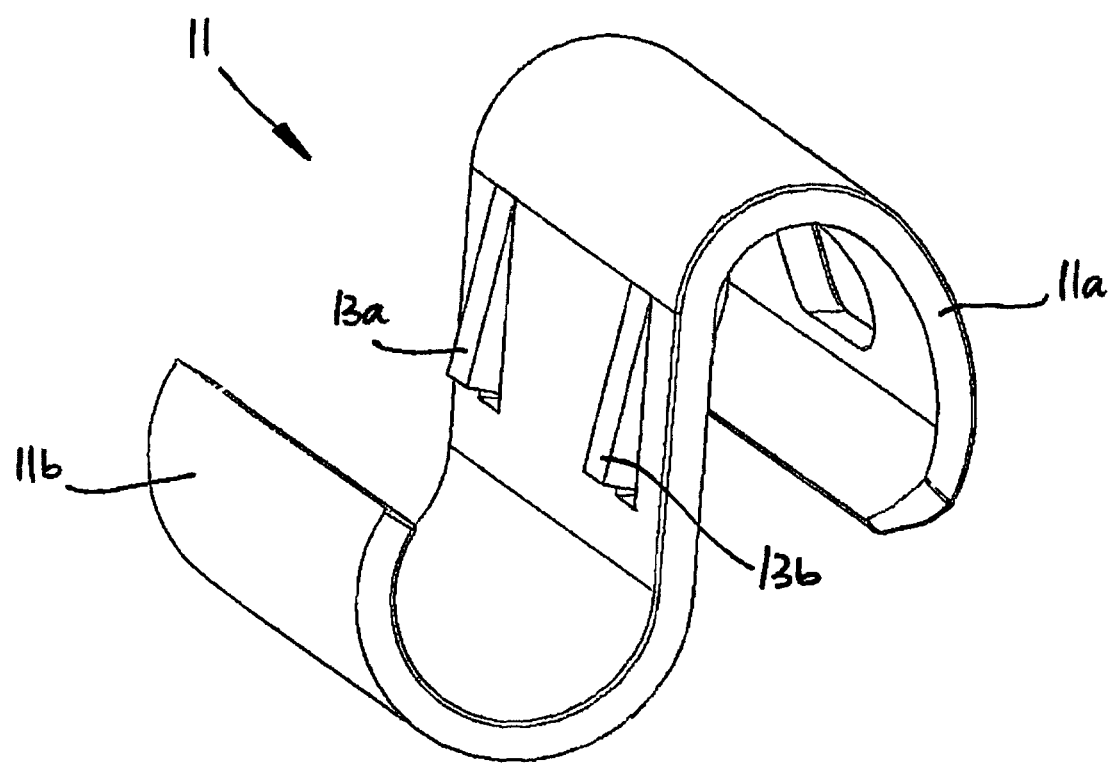
Figure 4:
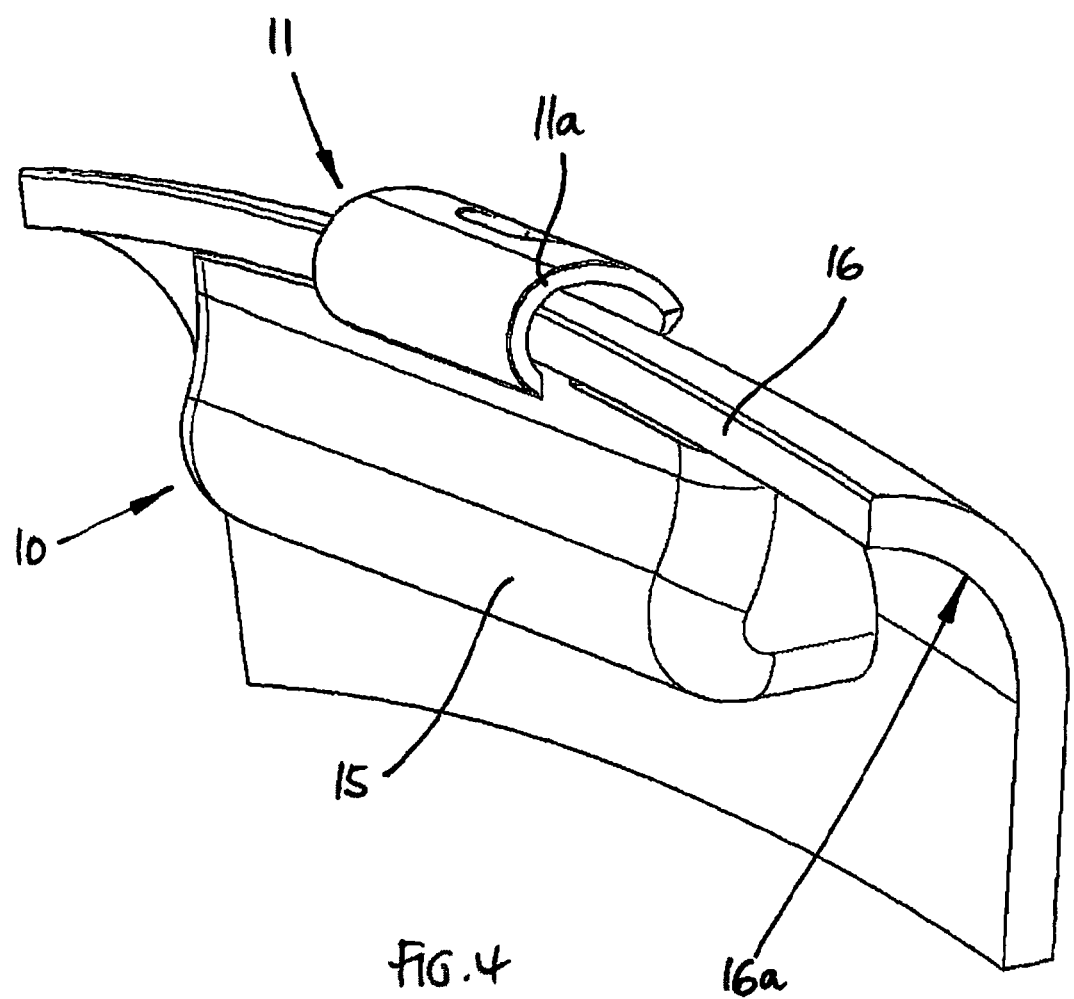
Figure 6:
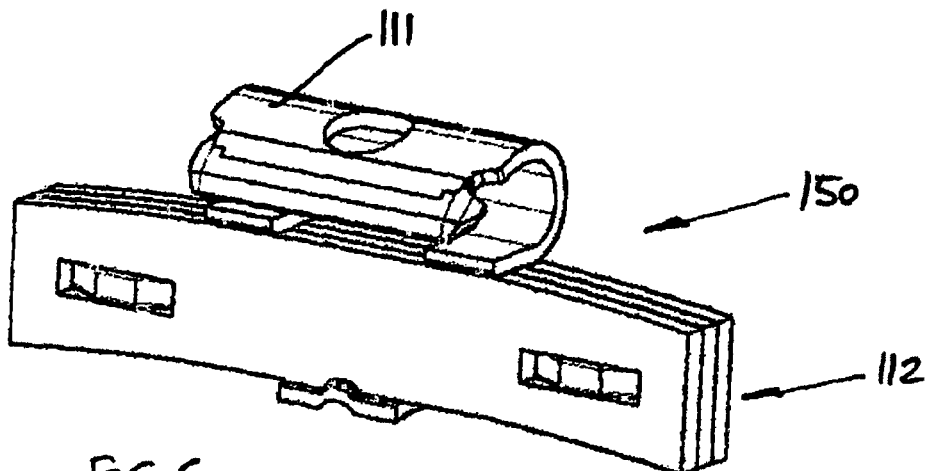
Figure 5B:
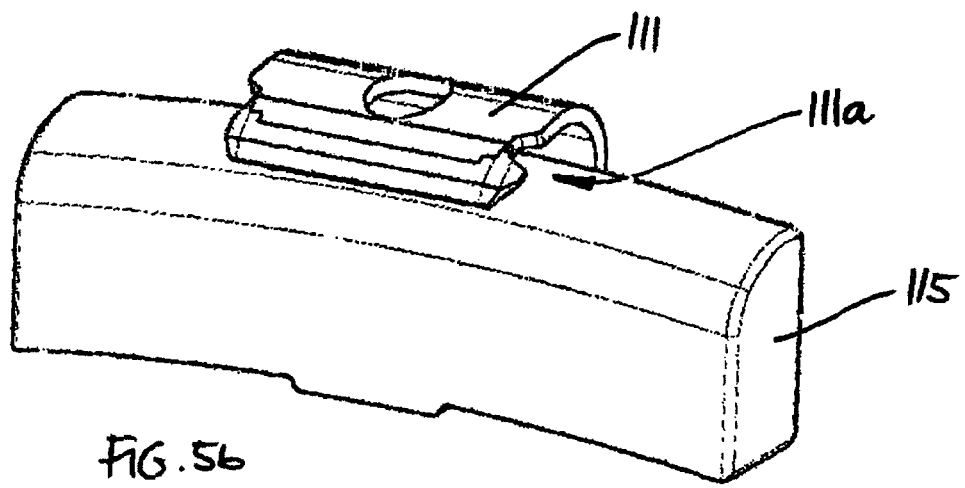
Figure 5A:
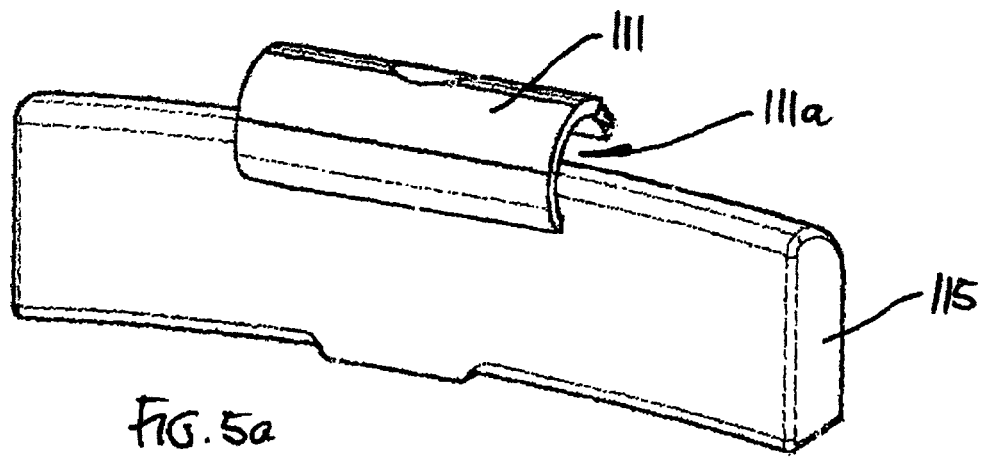
Figure 10A:
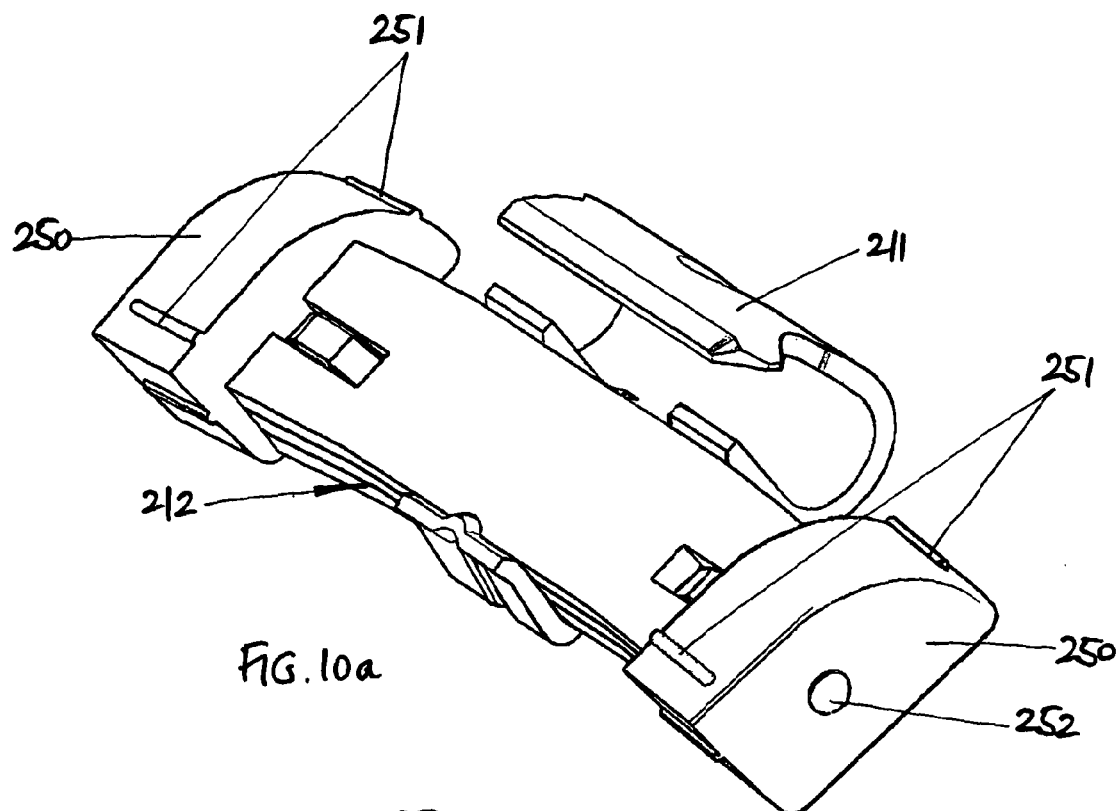
Figure 10B:
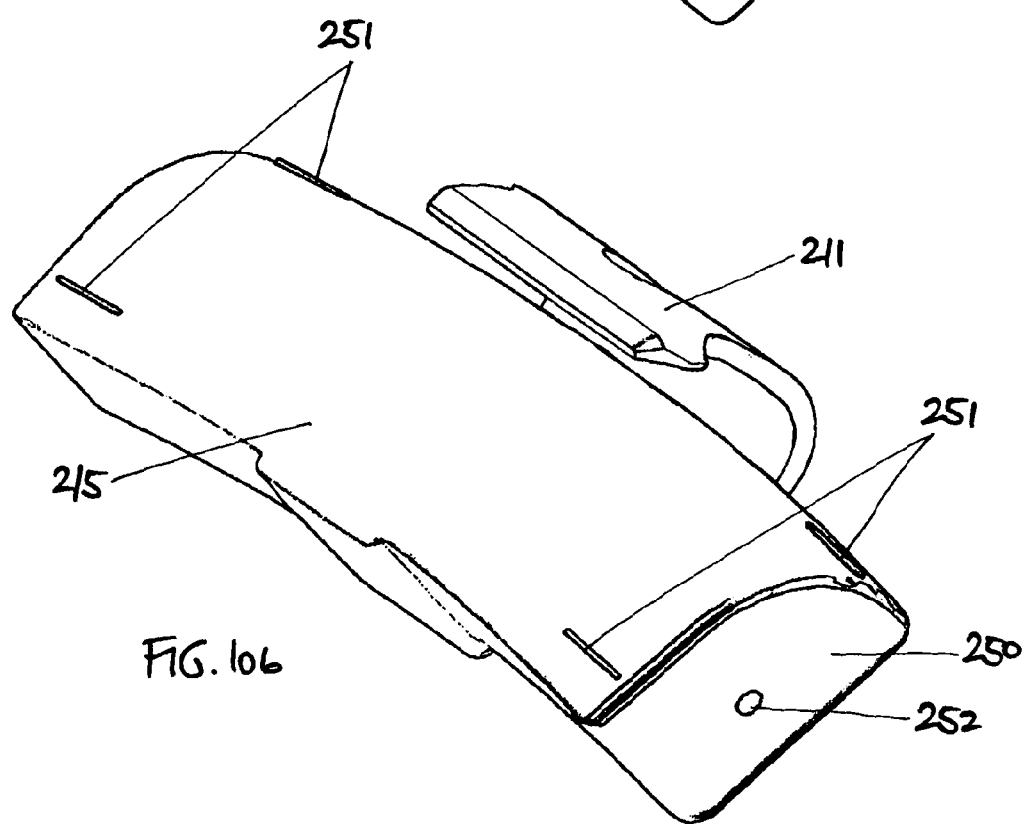

By way of example, embodiments of the invention will now be described with reference to the accompanying drawings, in which:

FIG. 1 shows a first form of a wheel weight assembly according to the invention, FIG. 2 shows a sub-assembly of the clip and weight members, FIG. 3 shows the clip member, FIG. 4 shows the wheel weight assembly of FIG. 1 in position on a wheel rim, FIGS. 5a and 5b show a second form of a wheel weight assembly according to the invention, FIG. 6 shows a sub-assembly of the clip and weight members, FIGS. 7a and 7b show the clip member, FIG. 8 shows a sub-assembly of individual plate elements, FIGS. 9a and 9b show the individual plate elements, and FIGS. 10a and 10b show a modified form of the assembly seen in FIGS. 5 to 9.

The basic components of the wheel weight assembly 10 seen in FIGS. 1 to 4 of the drawings are a clip member 11 and a weight member 12 (see FIG. 2). The clip member 11 is conveniently made from a flat metal sheet or strip and is formed into a general "S" shape. One limb 11a of the "S" shape is designed to fit over the rim of a vehicle wheel. In this respect, the limb 11a is shaped much like the clip of a conventional wheel weight. The other limb 11b is designed to carry the weight member 12.

The weight member 12 here conveniently consists of a length of standard round-section rod stock. The limb 11b of the clip member 11 that carries the weight member 12 is rounded to suit. The weight of the weight member 12 is of course determined by its length (and material). It will be understood, therefore, that the assembly can conveniently be produced in a range of different weights using the same clip member and a supply of standard rod stock, which is simply cut to different lengths. Here, a round-section rod stock is preferred. However, other sections of a standard rod or bar stock could equally well be used instead.

The clip member 11 is formed with two raised barbs 13a, 13b (see FIG. 3). The tips of the barbs 13a, 13b are designed to intrude slightly into the space that the weight member 12 occupies when it is received in its limb 11b of the clip member 11, so that the weight member is received with an interference fit. The weight member 12 can be pushed past the barbs 13a, 13b and into position in the limb 11b, as the clip member 11 is able to flex slightly. The tips of the barbs 13a, 13b are arranged to be "over centre" relative to the weight member 12, so that when it is pushed fully home into its limb 11b, the barbs will tend to lock it in position there.

With the weight member 12 fixed in position in the clip member 11 in this manner, the two together form a sub-assembly 14 (see FIG. 2). This is then encased within a housing 15 (see FIG. 1). The outer profile of the housing 15 is shaped to suit wheel rims, so that the assembly can fit snugly on a wheel. Thus, the housing 15 has a curved longitudinal axis to correspond with a wheel diameter and is radiused on its inner edge facing the clip member to correspond with the fillet radius of a wheel rim.

The housing 15 may be of metal such as zinc or some other material such as plastics. It is conveniently formed directly around the sub-assembly 14 using a known injection moulding technique called insert moulding. This essentially involves placing the clip and weight sub-assembly 14 into the mould tool, with the housing 15 then being formed around it.

Inserts can be expected to experience fairly substantial forces in insert moulding processes. It is therefore important that the insert, which here is the clip and weight member sub-assembly, is capable of withstanding these forces. The manner of attachment of the weight member to the clip member ensures that this is so.

One of the benefits of the housing 15 is that it protects the majority of the sub-assembly 14 from the surrounding atmosphere and thus helps to reduce corrosion of its component parts. Another benefit is that the housing 15 can be used to enhance the security of attachment of the wheel weight assembly 10 to a wheel. For this purpose, the housing 15 here has a deformable section in the form of a raised portion of material or land 15a in the region opposite the limb 11a of the clip member 11 (see FIG. 1). The idea is that when the wheel weight assembly 10 is fitted onto a wheel rim 16 (see FIG. 4), the land 15a will engage the inner radial surface 16a of the rim with an interference fit, causing a certain amount of deformation of the land. This will assist in the wheel weight assembly 10 gripping the rim 16, due to the resilient nature of the plastics material of the housing 15. The arrangement also makes the wheel weight assembly 10 adaptable for use on different wheels, because the deformable land 15a is able to take up differences in curvature, thickness and fillet radius of the wheel rim.

Another benefit of the housing 15 is that its external shape can be tailored to suit the wheel on which it is intended to be used, both in terms of its shape and configuration, and also in terms of its colour and general appearance. Furthermore, a number of differently weighted assemblies can be produced using the same external shape of housing, meaning that a whole range can be manufactured in the same mould tool.

The housing can also be used conveniently to display the particular weight of each assembly, for example by colour coding, even possibly by using different coloured plastics to signify the different weights.

The wheel weight assembly shown in FIGS. 5 to 9 of the drawings is again for attachment to the rim of a vehicle wheel to enable the wheel to be balanced. The assembly comprises a clip member 111 and a weight member 112. The clip member 111 has a curved portion 111a at one end that is designed to fit snugly over a wheel rim in known manner. At its other end 111b, the clip member 111 is shaped to receive and mount the weight member 112. The clip and weight member sub-assembly 150 is seen in FIG. 6.

Here, the weight member 112 is in the form of a composite sub-assembly comprising a plurality of individual plate elements 112a, 112b, as seen in FIG. 8. The plate elements 112a, 112b are conveniently made out of flat metal such as steel sheet or strip and formed in a punching process. The plate elements 112a, 112b all have the same basic symmetrical shape and are arranged to fit the end 111b of the clip member 111 where they are located and mounted. For this purpose, the plate elements 112a, 112b are formed with a notch 130 midway along their lower edge, which is designed to engage a rib 131 formed on the clip member 111. This locates the plate elements centrally on the clip member 111. The plate elements 112a, 112b are designed to be sprung into position on the clip member 111 between upper flanges 132a, 132b and a lower flange 133 and are held in place there by spring force.

Here, the weight member 112 comprises three plate elements 112a, 112b. However, the number of plate elements 112a, 112b can be varied and the clip member 111 is designed to be able to mount different numbers of them. The overall weight of the weight member 112 will depend not only on the overall shape, thickness and material of the plate elements 112a, 112b, but also on the number of them that are used in the sub-assembly. In practice, the plate elements 112a, 112b will typically be made from standard flat plate of a certain thickness and produced in the same basic shape, but in various different lengths. The desired weight for the weight member 112 can then be achieved using an appropriate number of plate elements 112a, 112b of the appropriate length. It will be appreciated that this manner of construction provides a convenient and easily variable way of producing a range of weight members 112 of different overall weights. In manufacturing terms, it is also more accurate and economical to work on a number of thinner elements than a single thicker one.

It will be understood that the shape and configuration of the plate elements may be varied from that shown in the drawings, as can the manner of their location and mounting to the clip member.

The plate elements 112a, 112b are also designed to remain connected to each other as an integral unit when they are assembled together to form the weight member 112 seen in FIG. 8. For this purpose, plate element 112a is partially punched through to form a pair of raised beads 140 on one side, with corresponding indentations on the other. The raised beads 140 of one plate element 112a are engageable with a force-fit to nest in the indentations in a neighbouring plate element 112a, thus serving to hold the two plate elements together. One of the plate elements 112b is punched with through holes 141. The through holes 141 are to receive the raised beads 140 of a neighbouring plate element 112a. Plate element 112b can thus be used at one end of the weight member 112 to leave it with a flush surface profile on each opposing face, as seen in FIG. 8.

It will be appreciated that many other different arrangements may be used instead to ensure that the individual plate elements remain together as an integral unit in the weight member sub-assembly.

In the finished wheel weight assembly, seen in FIGS. 5a and 5b, the clip and weight member sub-assembly 150 is substantially encased in a housing 115. The housing 115 covers the entire weight member 112 and all of the clip member 111, except for its curved end portion 111a. The outer profile of the housing 115 is again shaped to suit wheel rims, so that the assembly can fit snugly on a wheel. Thus, the housing 115 has a curved longitudinal axis to correspond with a wheel diameter and is radiused on its inner edge facing the clip member to correspond with the fillet radius of a wheel rim. As before, the housing 115 may incorporate a raised land or other form of protuberance in the vicinity of the clip member 111 to engage the wheel rim and thus enhance the security of its anchorage to the wheel.

The housing 115 is again conveniently formed by an insert moulding process using a metal such as zinc or some other suitable material such as plastics. Here, the clip and weight member sub-assembly is able to resist the forces expected in the insert moulding process and remain intact due to the spring engagement between the clip and weight members and the force-fit nesting engagement between the individual plate elements 112a, 112b.

The housing 115 in this embodiment has all the same advantages as the housing 15 in the previous embodiment. In particular, it will be noted that the housing 115 is capable of accommodating clip and weight member sub-assemblies 150 with different numbers of plate elements 112a, 112b. Conveniently, this means that a range of wheel weight assemblies can be produced that have different overall weights but that retain the same external profile. This helps the manufacturing process, since one mould tool can be used for making a number of differently weighted assemblies.

FIG. 10b shows a modified form of wheel weight assembly in its finished form; and FIG. 10a shows it at an intermediate stage of its manufacture. The clip element 211 and weight member sub-assembly 212 in this example are essentially the same as the corresponding parts of the assembly seen in FIG. 6. Here, however, the weight member sub-assembly 212 is provided with spacer elements as a preliminary step to the formation of the housing 215. The spacer elements here take the form of end caps 250, and their main purpose is to act as spacers to hold the weight member sub-assembly 212 in position in the mould tool during the moulding of the housing 215. The end caps 250 ensure a positive location of the weight member sub-assembly 212 within the cavity of the mould tool and thus avoid the possibility of its being twisted or moved out of position by the pressures of the moulding process. Without such positive positioning, there is a risk that the housing will not properly cover the weight member sub-assembly and potentially leave it partly exposed to the elements.

The end caps 250 can be made of the same material as the housing 215 and may be of plastics, zinc or other material. Alternatively, the end caps 250 and housing 215 could be made of different materials, such as zinc for the end caps and plastics for the housing or hard and soft plastics. The end caps 250 could also be formed in textures and/or colours to contrast with the housing and/or with each other.

The end caps 250 could be formed around the weight member sub-assembly 212 in a preliminary moulding operation. Alternatively, they could be made as pre-formed parts and applied to the weight member sub-assembly 212 by other means, eg by push-fitting. The presence of the end caps 250 may mean that there is no need for the plate elements to be formed with the punched detail to hold them together, as this will be achieved instead by the end caps.

As seen in FIG. 10a, the end caps 250 are formed with a number of raised ribs 251 spaced around their outer lateral surface and a raised boss 252 on each end face. One function of these ribs and boss 251, 252 is to ensure that the sub-assembly seen in FIG. 10a will sit securely in position when it is placed in the mould tool cavity, whilst allowing the moulding material injected into it to flow all around. This helps to create a smooth, integral surface finish for the housing 215. However, the ribs 251 can also have an additional purpose: they can be designed so that they will remain slightly proud of the surface of the housing 215 in the finished assembly, and so that they will come into contact with the wheel, and in particular the wheel rim, when the assembly is attached to it. This can help with the security of the anchorage of the assembly on the wheel rim, because the ribs 251 can act as deformable lands (or "fit modifiers") and take up minor differences in wheel shape and/or configuration.

It will be appreciated that the spacer elements may take other forms and configurations besides the end caps 250 seen in FIG. 10a. It will also be appreciated that the ribs and boss 251, 252 may take other forms and configurations and/or may be omitted altogether.

It will further be appreciated that the use of the spacer elements seen in FIGS. 10a and 10b can be applied to the manufacture of the other forms of wheel weight assemblies described above.

The invention claimed is:

1. A wheel weight assembly comprising a clip member and a weight member, wherein the clip member has a clip element adapted to attach to a wheel rim and a mount for the weight member, wherein the weight member comprises a composite sub-assembly comprising a plurality of individual elements, wherein the mount holds the plurality of individual elements together with the composite sub-assembly forming an integral unit, and wherein the mount comprises an upper flange and a lower flange extending in a spaced parallel relation, and an end extending between and interconnecting the upper and lower flanges, with the plurality of individual elements being stacked parallel to the end and extending generally perpendicularly between the upper and lower flanges.

2. An assembly as claimed in claim 1 wherein the plurality of individual elements is configured to nest together in a force fit.

3. An assembly as claimed in claim 1 wherein the plurality of individual elements is all of substantially the same shape.

4. An assembly as claimed in claim 1 wherein each of the plurality of individual elements is formed from a flat metal sheet or strip.

5. An assembly as claimed in claim 1 wherein the mount uses spring force to mount the weight member in the clip member.

6. An assembly as claimed in claim 1 wherein the clip and weight member together form an integral sub-assembly and are mounted within a housing.

7. An assembly as claimed in claim 6 wherein the housing is of plastics material and formed around the clip and weight members in an insert moulding process.

8. An assembly as claimed in claim 6 wherein the housing is of metal such as zinc and formed around the clip and weight members in an insert moulding process.

9. An assembly as claimed in claim 6 wherein the housing has a portion that cooperates with the clip element of the clip member to enhance attachment of the assembly to a wheel rim.

10. An assembly as claimed in claim 9 wherein said portion of the housing comprises a deformable land.

11. An assembly as claimed in claim 6 wherein the housing displays information about the weight of the assembly.

12. An assembly as claimed in claim 7 wherein at least the weight member is provided with a spacer holding the weight member in position within a cavity of the mould tool during the insert moulding process.

13. An assembly as claimed in claim 12 wherein the spacer is provided on the weight member in a preliminary moulding step.

14. A plurality of wheel weight assemblies as claimed in claim 6 wherein the assemblies are of different weights, with the housing of each one being formed in the same mould tool.

15. An assembly as claimed in claim 1, wherein the plurality of individual elements comprises a first element including a raised bead and at least one second element including a through hole receiving the raised bead of the first element.

16. An assembly as claimed in claim 15, wherein the plurality of individual elements each comprises a notch formed in an edge opposite to the upper flange, and wherein the lower flange includes a rib extending perpendicular to the end and slideably received in the notch of each individual element.

17. An assembly as claimed in claim 16, wherein the raised bead and the through hole are located intermediate and spaced from the upper and lower flanges.

18. An assembly as claimed in claim 16, further comprising first and second end caps located on opposite ends of the composite sub-assembly, with the upper and lower flanges being intermediate and spaced from the first and second end caps.

19. Method for forming a wheel weight assembly comprising:
    mounting a weight member to a clip member to form a sub-assembly, with the clip member including a clip element adapted to attach to a wheel rim; and
    positioning the sub-assembly in a cavity of a mould tool and insert moulding a housing substantially encasing the sub-assembly aside from the clip element.

20. The method as claimed in claim 19, further comprising:
    stacking a plurality of individual elements to form the weight member; and wherein mounting the weight member includes providing a spacer on the weight member, with the spacer holding the sub-assembly in position in the cavity of the mould tool during insert moulding.

21. The method as claimed in claim 20, further comprising:
    mounting a further weight of a different size than the weight member to a further clip member to form a further sub-assembly; and
    positioning the further sub-assembly in the cavity of the mould tool and insert moulding a further housing substantially encasing the further sub-assembly, with the housing and further housing being of a same outer size.

* * * * *